United States Patent
Campbell

[19]

[11] Patent Number: 6,112,452
[45] Date of Patent: Sep. 5, 2000

[54] TOPS FOR MAKING COMMON BOTTLES INTO INSECT TRAPS

[76] Inventor: Kevin T. Campbell, 1120 Adrienne Dr., South Elgin, Ill. 60177

[21] Appl. No.: 09/207,101

[22] Filed: Dec. 7, 1998

[51] Int. Cl.[7] .......................... B65D 51/00; B65D 51/24; B65D 51/16; A01M 1/10
[52] U.S. Cl. ...................... 43/107; 220/287; 220/367.1; 215/319
[58] Field of Search .............. 43/107; 220/287, 220/367.1; 215/329, 319

[56] References Cited

U.S. PATENT DOCUMENTS

| | | |
|---|---|---|
| D. 285,179 | 8/1986 | Browne . |
| D. 335,521 | 5/1993 | Petersen . |
| 1,011,347 | 12/1911 | Humpal . |
| 1,139,717 | 5/1915 | Pipenhagen . |
| 1,445,543 | 2/1923 | Nelson . |
| 1,629,402 | 5/1927 | March . |
| 1,772,729 | 8/1930 | Pisani . |
| 1,867,252 | 7/1932 | Crigler . |
| 1,882,380 | 10/1932 | Braun . |
| 2,770,066 | 11/1956 | O'Sullivan . |
| 4,218,842 | 8/1980 | Anderson . |
| 4,551,941 | 11/1985 | Schneidmiller . |
| 4,571,880 | 2/1986 | Hayward . |
| 4,583,668 | 4/1986 | Maynard, Jr. ........................ 222/529 |
| 4,794,724 | 1/1989 | Peters . |
| 4,858,374 | 8/1989 | Clemons . |
| 4,873,787 | 10/1989 | Schneidmiller . |
| 4,899,485 | 2/1990 | Schneidmiller . |
| 5,226,254 | 7/1993 | MacMeingall . |
| 5,392,558 | 2/1995 | Blomquist . |
| 5,557,880 | 9/1996 | Schneidmiller . |

*Primary Examiner*—Jack W. Lavinder
*Attorney, Agent, or Firm*—Meroni & Meroni; Charles F. Meroni, Jr.

[57] ABSTRACT

An insect trap head that can be configured to contain one or two sets of threads to enable the invention to screw onto common household bottles with different opening diameters and different threading alignment and convert these bottles into an insect trap. The insect trap head has a cylindrical top section with an entry opening and a first set of threads being axially orientated to enable the top section to screw onto a bottle with an externally threaded neck. A conical insect entryway section is disposed in the entry opening of the top section. The insect entryway having an entryway skirt section gradually tapering as it projects downwards defining a bottom opening. A ring-shaped bottom section extends peripherally from the top section. The bottom section has a second set of threads that are axially orientated to enable the bottom section to screw onto an alternative bottle requiring a different orientation of threads than that of the first set of threads.

16 Claims, 7 Drawing Sheets

TOPS FOR MAKING COMMON BOTTLES INTO INSECT TRAPS

BACKGROUND OF THE INVENTION

1. Field of the Invention

The present invention relates to an insect trap particularly suited for entrapping wasps, and other similar flying insects.

2. Description of the Prior Art

Wasps and other similar stinging flying insects can become a significant nuisance to most outdoor outings. Attracted to the scent of most foods, these creatures will persistently hover and crawl over food particles making dining outdoors practically impossible. Wasps, in particular, are especially disruptive. These creatures are strongly attracted to the scent of most foods, and they have powerful stingers which can inflict a painful sting. In some cases, wasp stings have caused severe allergic reactions resulting in serious discomfort and even death.

In order to minimize the number of wasps and other similar flying insects present in a given area, insect traps are used to trap and kill these flying pests. The present invention provides a cost effective and reusable means for trapping wasps and other similar flying insects. The present invention is an insect trap head which can screw onto many common household bottles, allowing these bottles to be used as insect traps.

Prior to the present invention, most flying insect traps used jars or bags as trapping containers. The jars have the advantage of having a rigid structure, allowing them to hold liquid baits. The ability of these jars to hold liquid bait is an added advantage because the liquid serves a dual purpose. First, the liquid bait provides a scent with which to attract the wasps, and secondly, the liquid bait drowns the wasps once they are inside the trap. The rigid structure allows the jar traps to withstand moisture, wind and some inadvertent impact, without losing its effectiveness. The jars are also reusable if cleaned after use. The major drawbacks of using a jar trap is the cost of the jar, and the onerous task of cleaning the jar in order to reuse them.

Paper and plastic bags can provide a more affordable trapping container. However, the lack of rigidity in these paper or plastic bags limits their effectiveness. The bags usually do not have sufficient weight to withstand light winds, and so they are easily buffeted around by the wind. Furthermore, moisture may weaken the bag and allow the bag to be easily torn. Also, most are not able to handle liquid baits, and they are seldom reusable. Consequently, these traps are often marketed as single use products which are thrown away once the odoriferous bait is no longer effective.

Accordingly, it is desirable to combine the reusability and rigid structure of the jar traps with the cost effectiveness of the bag traps. As will be described in greater detail hereinafter, the present invention solves the aforementioned and employs a number of novel features that render it highly advantageous over the prior art.

SUMMARY OF THE INVENTION

Accordingly, it is an object of this invention to provide a reusable and inexpensive means for trapping wasps and other similar flying insects. To achieve this objective, a reusable insect trap head is provided which is capable of engaging normally discarded, common household bottles and converting them into insect traps.

The insect trap head has a cylindrical top section having a circular horizontal section and a side wall section. The horizontal section has a circular entry opening with a diameter no greater than 1 inch. An annular flange upwardly extends from the horizontal section encircling the entry opening. The side wall section extends peripherally downward from the horizontal section. The side wall section has an exterior surface and an interior surface. A connecting strip extends vertically from the exterior surface of the side wall section. The connecting strip has a distal end which is connected to a cap of sufficient size to engage the annular flange on the horizontal section and form a leakproof seal. A first set of threads project radially inward from the interior surface of the side wall section. The first set of threads are axially oriented to enable the top section to screw onto a bottle with an externally threaded neck.

A ring-shaped bottom section, extends peripherally from the side wall section of the top section. The bottom section has a second exterior surface and a second interior surface. A second set of threads project radially inward from the second interior surface. The second set of threads are axially oriented to enable the bottom section to screw onto an alternative bottle with an externally threaded bottle neck requiring a different orientation of threads than that of the first set of threads.

A conical insect entryway section is disposed of in the entry opening on the top section. The insect entryway section has a circular base entryway surface, an entryway skirt section, and an apex surface area. The base entryway surface is positioned flush onto the horizontal section of the top section encircling the entry opening. The entryway skirt section extends peripherally from the base entryway surface gradually tapering as it projects downwards to the apex surface area. The entryway skirt section has a plurality of circular skirt openings for venting the bottle, the circular skirt openings having a diameter no greater than 1/16 inch. The apex surface area emerges from the entryway skirt section, the apex surface area defining a bottom opening no greater than 21/64 inch in diameter.

Other objects, features, and advantages of the invention will become more readily apparent upon reference to the descriptions and drawings to follow.

DESCRIPTION OF THE PREFERRED EMBODIMENT OF THE INVENTION

The present invention relates to an insect trap head 10 for converting normally discarded, common household bottles into insect traps. In the following description, numerous specific details are set forth in order to provide a thorough understanding of the present invention.

Figure 1:
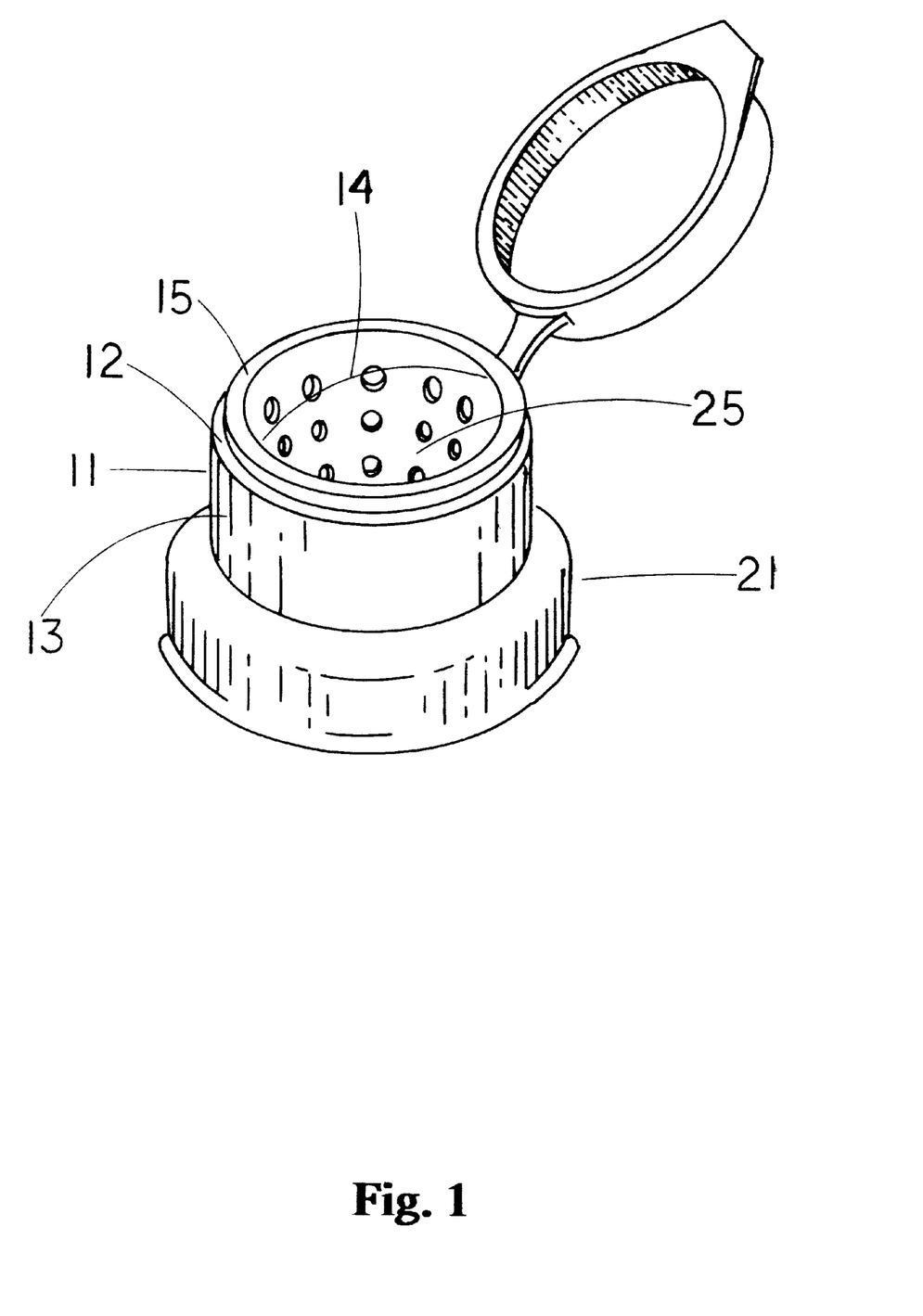
FIG. 1 is an elevated side view of the insect trap head illustrating important features.
Figure 2:
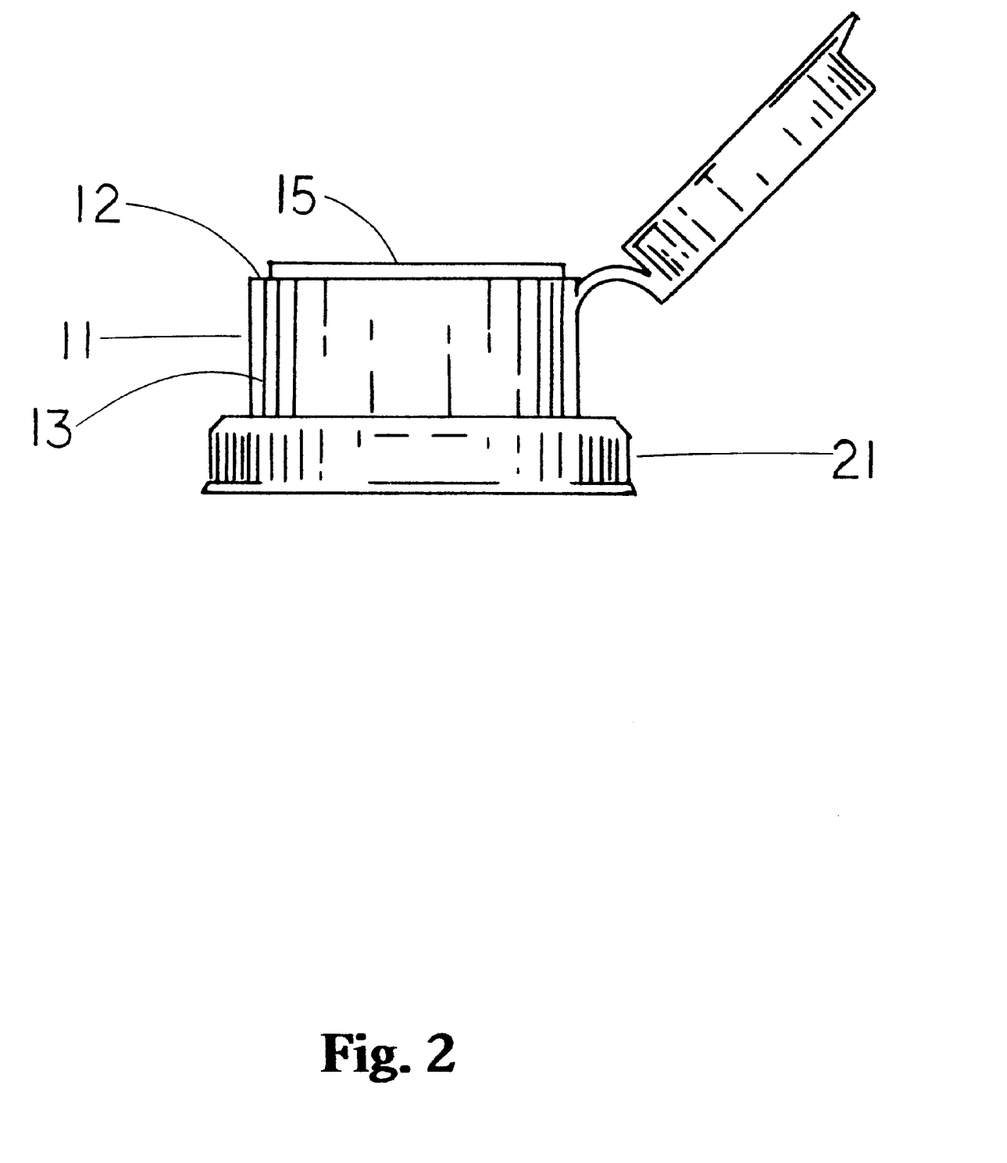
FIG. 2 is a side view of the insect trap head shown in FIG. 1.
Figure 3:
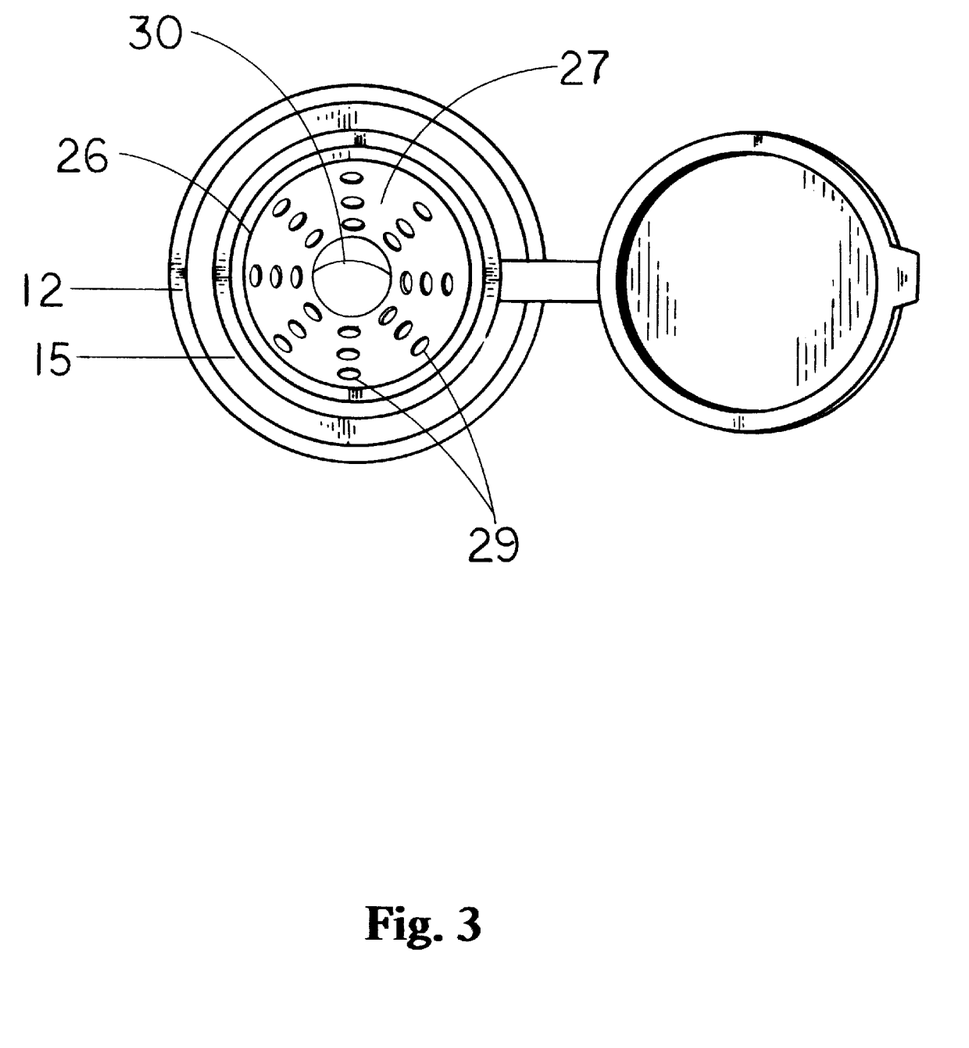
FIG. 3 is an overhead planar view of the insect trap head shown in FIG. 1.

FIGS. 1, 2, and 3 show a cylindrical top section 11 being a tube like structure having a circular horizontal section 12, and a side wall section 13. The horizontal section has an entry opening 14 with a diameter preferably no greater than 1 inch. An annular flange 15 extends upwardly from the horizontal section and encircles the entry hole 14. The side wall section 13 extends peripherally downward from the horizontal section.

Figure 4:
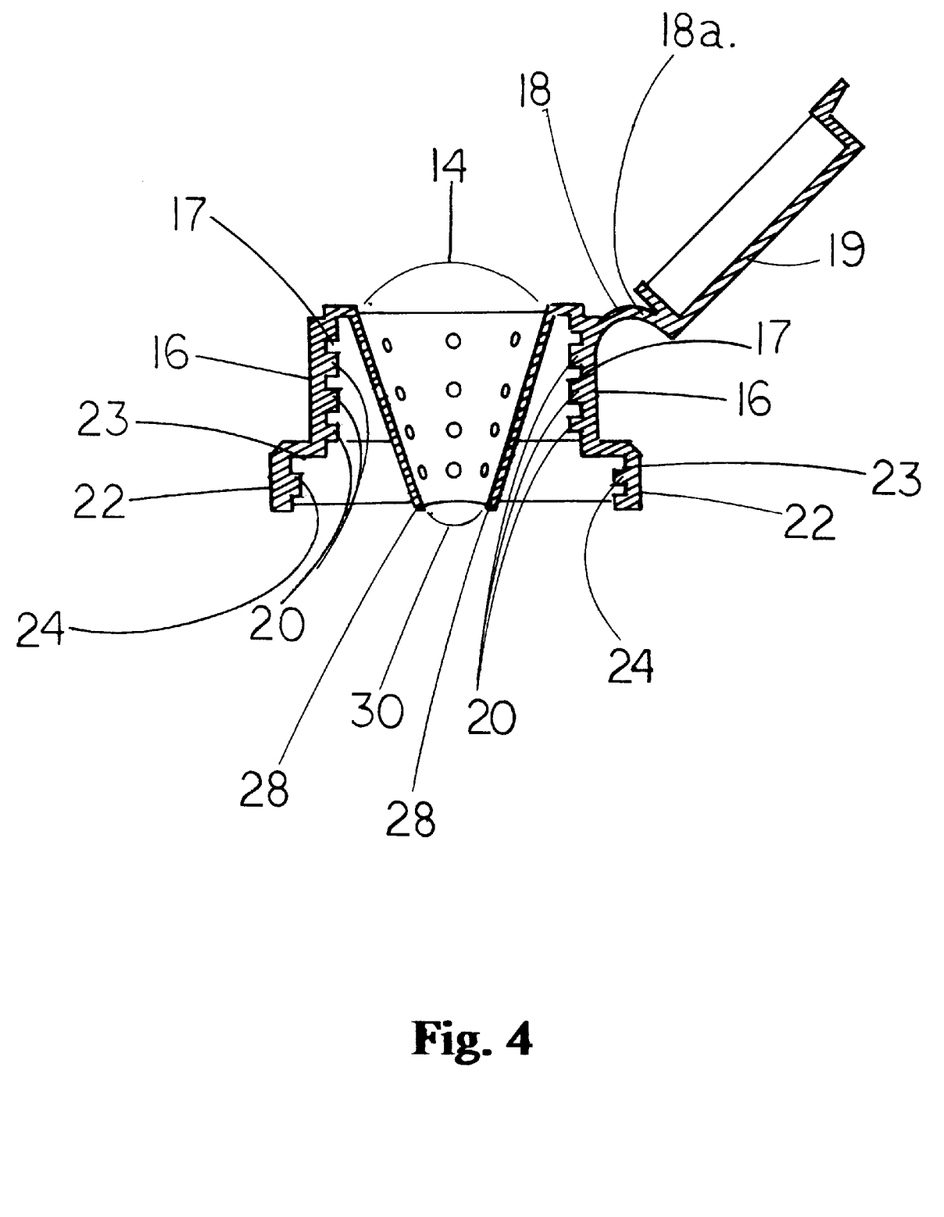
FIG. 4 is a cross sectional view taken on the line V—V in FIG. 2.
Figure 5:
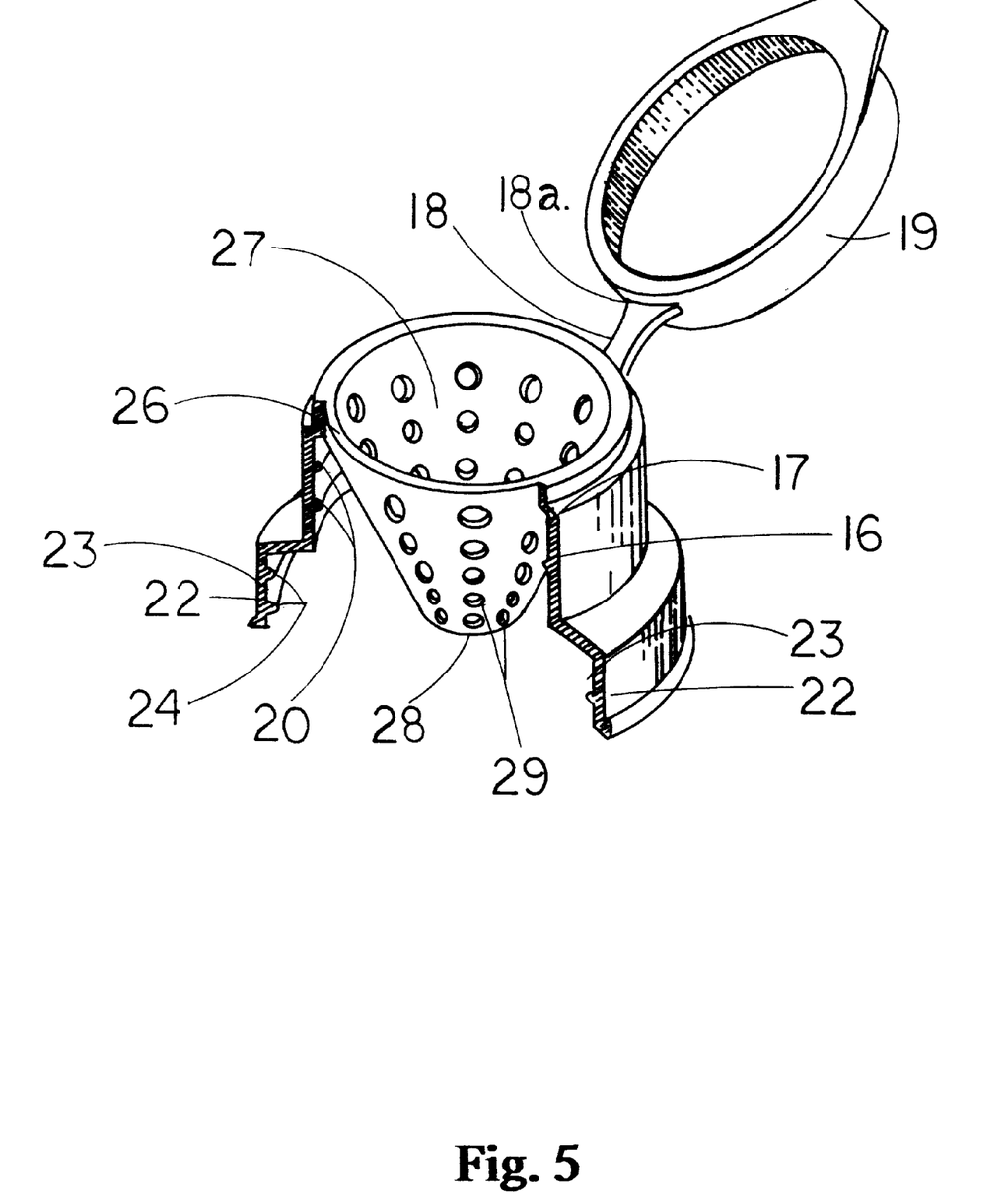
FIG. 5 is a fragmented sectional view of FIG. 1 taken on the line V—V.

FIGS. 4 and 5 show the side wall section 13 having an exterior surface 16 and an interior surface 17. A connecting strip 18 having a distal end 18a which is attached to a cap 19 extends from the exterior surface 16. The cap 19 and the annular flange 15 are of complementary diameters enabling the cap to engage the annular flange and form a leak proof seal.

Emerging radially inward from the interior surface 17 of the side wall section 13 is a first set of threads 20. The first set of threads 20 is axially oriented in order to enable the present invention to screw onto a bottle with a threaded neck.

FIGS. 1, 2, 4, and 5 show a ring-like bottom section 21 extending peripherally from the side wall section 13 of the top section 11. The bottom section 21 has a second exterior surface 22, a second interior surface 23, and a second set of threads 24 projects radially inward from the second interior surface 23.

The diameter of the cavity defined by the first interior surface 17 is less than the diameter of the cavity defined by the second interior surface 23. Also, the first set of threads 20 and the second set of threads 24 can have differing axial orientations. Consequently, the insect trap head is capable of engaging two (2) different sizes of externally threaded bottlenecks, with the top section 11 engaging smaller bottleneck sizes and the bottom section 21 engaging larger bottle neck sizes. It is further contemplated that the insect trap head 10 can be configured to be fitted and engaged with a pop can to serve as an insect trap if desired.

FIGS. 1, 3, 4, and 5 show an insect entryway 25 disposed in the entry opening 14 of the top section 11. The insect entryway 25 is a hollow conical structure having a base entryway surface 26, an entryway skirt section 27, and an apex surface area 28. The base entryway surface 26 is positioned flush onto the horizontal section 12, encircling the entry opening 14. The entryway skirt section 27 extends peripherally downwards from the base entryway surface 26, forming a passageway which extends from the base entryway surface 26 and gradually tapers downward to the apex surface area 28. The entryway skirt section may be contiguous, but in the preferred embodiment, the entryway skirt section is lined with a plurality of circular skirt openings 29. The diameter of the circular skirt openings 29 in the preferred embodiment should preferably be at least 1/16 inch in diameter but this invention is not intended to be specifically limited to this dimension. These skirt openings allow the aroma of the bait to pass through the insect entryway, without allowing most trapped insects to escape. The apex surface area 28 defines a circular bottom opening 30 no greater than 21/64 inch in diameter.

Figure 6:
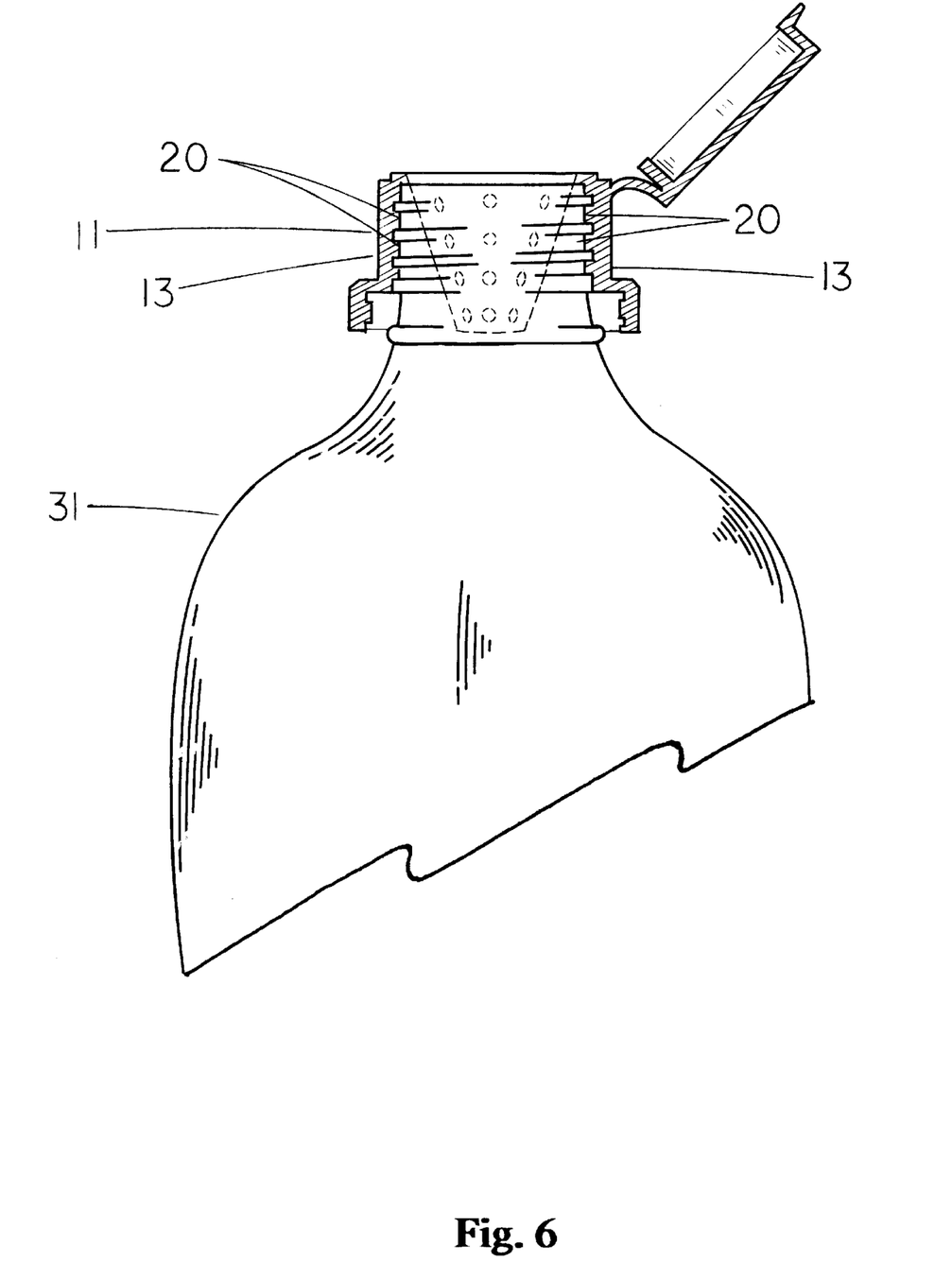
FIG. 6 is a cross-sectional view of the insect trap head on the line V—V in FIG. 2 with the insect trap head engaged to a standard plastic pop bottle.

FIG. 6 shows the top section 11 of the insect trap head engaged to a standard pop bottle 31. In the preferred embodiment, the insect trap head is configured so that the side wall section 13 has the diameter of a standard pop bottle neck, and the first set of threads 20 is axially oriented to enable the top section 11 to screw onto the threaded neck of a standard pop bottle. This allows the top section to engage most 12 oz., 16 oz., 20 oz., and 32 oz. plastic pop bottles. The top section will also work with most 12 oz. glass bottles with a threaded neck.

Figure 7:
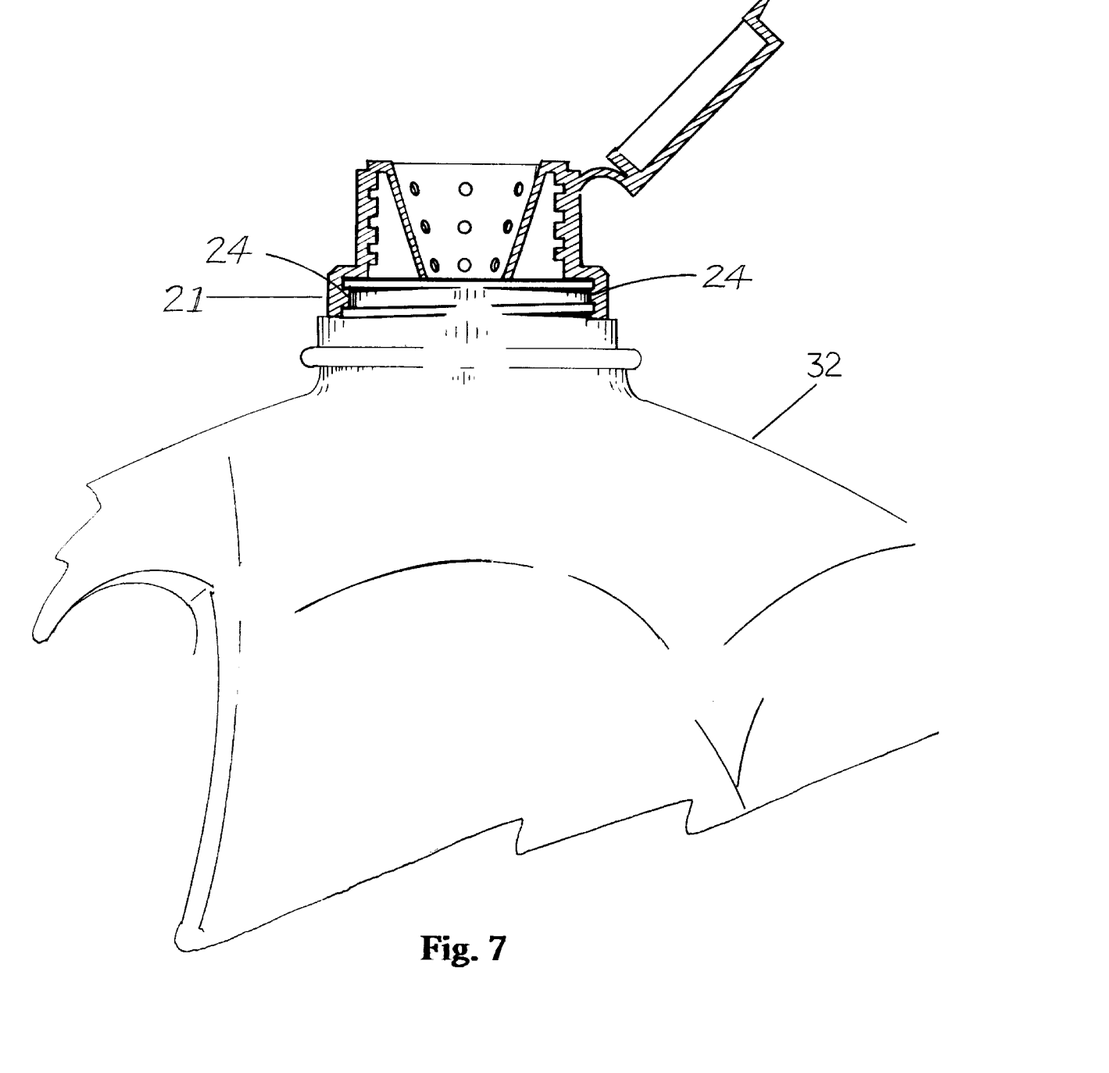
FIG. 7 is a cross-sectional view of the insect trap head on the line V—V in FIG. 2 with the insect trap head engaged to a standard plastic milk bottle.

FIG. 7 shows the bottom section 21 of the insect trap head engaged to a one gallon plastic milk bottle 32. In the preferred embodiment, the bottom section 21 has the diameter of a standard one gallon plastic milk bottle 32 with the second set of threads 24 being axially oriented to enable the bottom member to screw onto a standard one gallon plastic milk bottle. Since most plastic one quart milk bottles have the same bottle neck size as the plastic one gallon milk bottles, the bottom section 21 will also be capable of engaging most one quart plastic milk bottles as well. If desired this insect trap head 10 can be configured to be assembled with other sized bottle openings or pop cans than those specifically referred to herein.

The insect trap head provides a cost effective and reusable means for trapping wasps and other similar flying insects by utilizing normally discarded, common household bottles, preferably milk and pop bottles, and converting them into insect traps. The insect trap head should be of a bright color, preferably lemon-yellow or a lime- green, in order to make the trap more attractive to wasps. The use of a synthetic plastic material, transformed through a one piece plastic injection molding process, is the most economical and preferred way of manufacturing the insect trap head. The use of a recyclable synthetic plastic material is preferred in order to reduce costs of production and to make the insect trap head more conservation friendly.

The insect trap head is simply screwed onto a trapping container with an externally threaded neck having a complementary thread orientation and with an odoriferous bait within, thus creating a trap. Preferable bait include raw fish, raw meat, apple juice, grape juice, and soda pop. The use of liquid baits within the trap add further to the effectiveness of the trap by drowning the wasps caught inside the trap.

The trap is set out in the morning preferably hung onto a tree or simply placed upon a table. The aroma of the bait and the insect trap head's color serve to attract wasps and similar flying insect to the trap, through the entryway, and into the trap. Once inside the trap the conical shape of the entryway prevents wasps and other similar flying insect from escaping from the bottle.

At the end of the day, the attached cap can be engaged to the annular flange forming a leak proof seal, and the trap can then be discarded. If the insect trap head is to be reused again, any living wasps trapped within the bottle can be drown by adding additional liquid and swirling the liquid within the bottle. The insect trap head can then be removed, and the original cap can be screwed onto the trapping container and the bottle can be discarded.

The invention described above is the preferred embodiment of the insect trap head. It is not intended that the novel device be limited thereby. The preferred embodiment may be susceptible to modifications and variations which are within the scope and fair meaning of the accompanying claims and drawings.

I claim:

1. An insect trap head for use with bottles having varied sized externally threaded bottle necks comprising:

a cylindrical top section having a circular horizontal section and a side wall section, the horizontal section having an entry opening with a diameter no greater than 1 inch, an annular flange section upwardly extending from the horizontal section encircling the entry opening, the side wall section extending peripherally downward from the horizontal section, the side wall section having an exterior surface and an interior surface, a connecting strip extending from the exterior surface of the side wall section, the connecting strip having a distal end which is attached to a cap of sufficient size to engage the flange on the horizontal section, and when engaged, providing a leakproof seal, a first set of threads projecting radially inward from the interior surface and being axially orientated to enable the top section to screw onto a bottle with an externally threaded neck, a ring-shaped bottom section extending peripherally from the side wall section of the top section, the bottom section having a second exterior surface and a second interior surface, a second set of threads projecting radially inward from the second interior surface and axially orientated to enable the bottom section to screw onto an alternative bottle with an externally threaded neck requiring a different orientation of threads than that of the first set of threads, and a conical insect entryway section disposed in the entry opening of the top section, the insect entryway section having a circular base entryway surface, an entryway skirt section, and an apex surface area, the base entryway surface positioned flush onto the horizontal section of the top section encircling the entry opening, the entryway skirt section peripherally extending from the base entryway surface, the entryway skirt section gradually tapering as it projects downwards, the entryway skirt section having a plurality of circular skirt openings for venting the bottle, the circular skirt openings having a diameter no greater than $1/16$ inch, the apex surface area emerging from the entryway skirt section, the apex surface area defining a bottom opening no greater than $21/64$ inch in diameter.

2. The insect trap head in claim 1, wherein the insect trap head comprises a one piece molded structure made from a synthetic plastic material.

3. The insect trap head in claim 2 wherein the first set of threads are axially oriented to enable the top section to screw onto a pop bottle, and the second set of threads being axially oriented to enable the bottom section to screw onto a plastic milk bottle.

4. The insect trap head in claim 1 wherein the first set of threads are axially oriented to enable the top section to screw onto a plastic milk bottle.

5. The insect trap head in claim 1, wherein the insect trap head comprises a one piece molded structure made from a synthetic plastic material.

6. The insect trap head in claim 5 wherein the entryway skirt section has a plurality of circular skirt openings for venting the bottle, the circular skirt openings having a diameter of at least $1/16$ inch.

7. The insect trap head in claim 6 wherein the horizontal section has an upwardly extending annular flange section encircling the entry opening and a connecting strip extending from the exterior surface of the side wall section, the connecting strip having a distal end which is attached to a cap of sufficient size to engage the flange on the horizontal section, and when engaged, providing a leakproof seal.

8. An insect trap comprising:
a bottle member, having an externally threaded bottle opening, and
an insect trap head comprising:
a cylindrical top section having a circular horizontal section and a side wall section, the horizontal section having an entry opening with a diameter no greater than 1 inch, an annular flange section upwardly extending from the horizontal section encircling the entry opening, the side wall section extending peripherally downward from the horizontal section, the side wall section having an exterior surface and an interior surface, a connecting strip extending from the exterior surface of the side wall, the connecting strip having a distal end which is attached to a cap of sufficient size to engage the flange on the horizontal section and when engaged providing a leakproof seal, a first set of threads projecting radially inward from the interior surface and being axially orientated to enable the top section to screw onto a bottle with an externally threaded neck, a ring-shaped bottom section extending peripherally from the side wall section of the top section, the bottom section having a second exterior surface and a second interior surface, a second set of threads projecting radially inward from the second interior surface, enabling the bottom section to screw onto an alternate bottle member with an externally threaded bottle neck of a varied bottleneck diameter, and a conical insect entryway section disposed in the entry opening of the top section, the insect entryway section having a circular base entryway surface, an entryway skirt section, and an apex surface area, the base entryway surface positioned flush onto the horizontal section of the top section encircling the entry opening, the entryway skirt section peripherally extending from the base entryway surface, the entryway skirt section gradually tapering as it projects downwards, the entryway skirt section having a plurality of circular skirt openings for venting the bottle, the circular skirt openings having a diameter no greater than $1/16$ inch, the apex surface area emerging from the entry way skirt section, the apex surface area defining a bottom opening no greater than $21/64$ inch in diameter.

9. The insect trap in claim 8, wherein the insect trap head comprises a one piece molded structure made from a synthetic plastic material.

10. The insect trap in claim 8 wherein the first set of threads are axially oriented to enable the top section to screw onto a plastic milk bottle.

11. The insect trap in claim 8, wherein the insect trap head comprises a one piece molded structure made from a synthetic plastic material.

12. The insect trap in claim 11 wherein the entryway skirt section has a plurality of circular skirt openings for venting the bottle, the circular skirt openings having a diameter of at least $1/16$ inch.

13. The insect trap head in claim 12 wherein the horizontal section has an upwardly extending annular flange section encircling the entry opening and a connecting strip extending from the exterior surface of the side wall section, the connecting strip having a distal end which is attached to a cap of sufficient size to engage the flange on the horizontal section, and when engaged, providing a leakproof seal.

14. The insect trap in claim 12 wherein the first set of threads is axially oriented to enable the top section to screw onto a pop bottle, and the second set of threads being axially oriented to enable the bottom section to screw onto a plastic milk bottle.

15. An insect trap head for use with bottles having varied sized externally threaded bottle necks comprising:
a cylindrical top section having a circular horizontal section and a side wall section, the horizontal section having an entry opening with a diameter no greater than 1 inch, a first set of threads projecting radially inward from the interior surface and being axially orientated to enable the top section to screw onto a bottle with an externally threaded neck, and a conical insect entryway section disposed in the entry opening of the top section, the insect entryway section having a circular base entryway surface, an entryway skirt section, and an apex surface area, the base entryway surface positioned flush onto the horizontal section of the top section encircling the entry opening, the entryway skirt section peripherally extending from the base entryway surface, the entryway skirt section gradually tapering as it projects downwards, the apex surface area emerging from the entryway skirt section, the apex surface area defining a bottom opening no greater than $21/64$ inch in diameter, the insect trap head comprises a one piece molded structure made from a synthetic plastic material, the entryway skirt section has a plurality of circular skirt openings for venting the bottle, the circular skirt openings having a diameter of at least $1/16$ inch, the horizontal section has an upwardly extending annular flange section encircling the entry opening and a connecting strip extending from the exterior surface of the side wall section, the connecting strip having a distal end which is attached to a cap of sufficient size to engage the flange on the horizontal section, and when engaged, providing a leakproof seal, a ring-shaped bottom section extends peripherally from the side wall section of the top section, the bottom section having a second exterior surface and a second interior surface, a second set of threads projecting radially inward from the second interior surface and being axially orientated to enable the bottom section to screw onto an alternative bottle with an externally threaded neck requiring a different orientation of threads than that of the first set of threads.

16. An insect trap comprising:

a bottle member, having an externally threaded bottle opening, and an insect trap head comprising:

a cylindrical top section having a circular horizontal section and a side wall section, the horizontal section having an entry opening with a diameter no greater than 1 inch, a first set of threads projecting radially inward from the interior surface and being axially orientated to enable the top section to screw onto a bottle with an externally threaded neck, and a conical insect entryway section disposed in the entry opening of the top section, the insect entryway section having a circular base entryway surface, an entryway skirt section, and an apex surface area, the base entryway surface positioned flush onto the horizontal section of the top section encircling the entry opening, the entryway skirt section peripherally extending from the base entryway surface, the entryway skirt section gradually tapering as it projects downwards, the apex surface area emerging from the entryway skirt section, the apex surface area defining a bottom opening no greater than $21/64$ inch in diameter, the insect trap head comprises a one piece molded structure made from a synthetic plastic material, the entryway skirt section has a plurality of circular skirt openings for venting the bottle, the circular skirt openings having a diameter of at least $1/16$ inch, the horizontal section has an upwardly extending, annular flange section encircling the entry opening and a connecting strip extending from the exterior surface of the side wall section, the connecting strip having a distal end which is attached to a cap of sufficient size to engage the flange on the horizontal section, and when engaged, providing a leakproof seal, wherein a ring-shaped bottom section extends peripherally from the side wall section of the top section, the bottom section having a second exterior surface and a second interior surface, a second set of threads projecting radially inward from the second interior surface and being axially orientated to enable the bottom section to screw onto an alternative bottle with an externally threaded neck requiring a different orientation of threads than that of the first set of threads.

* * * * *